(12) United States Patent
Birnbaum et al.

(10) Patent No.: US 8,698,736 B2
(45) Date of Patent: Apr. 15, 2014

(54) HANDHELD COMPUTER INTERFACE WITH HAPTIC FEEDBACK

(75) Inventors: David M. Birnbaum, Oakland, CA (US); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 577 days.

(21) Appl. No.: 12/409,987

(22) Filed: Mar. 24, 2009

(65) Prior Publication Data

US 2010/0245232 A1     Sep. 30, 2010

(51) Int. Cl.
*G09G 5/00* (2006.01)
(52) U.S. Cl.
USPC .......................... 345/156; 345/161; 345/163
(58) Field of Classification Search
USPC ............................ 345/156, 161, 163; 463/49
See application file for complete search history.

(56) References Cited

U.S. PATENT DOCUMENTS

| | | | |
|---|---|---|---|
| 6,824,468 B2 * | 11/2004 | Murzanski et al. | 463/38 |
| 7,039,866 B1 * | 5/2006 | Rosenberg et al. | 715/701 |
| 7,283,120 B2 | 10/2007 | Grant | |
| 2005/0017454 A1 * | 1/2005 | Endo et al. | 273/317.1 |
| 2008/0055248 A1 * | 3/2008 | Tremblay et al. | 345/158 |
| 2008/0062145 A1 * | 3/2008 | Shahoian et al. | 345/173 |

OTHER PUBLICATIONS

Gabriel Robles-De-La-Torre, The Importance of the Sense of Touch in Virtual and Real Environments, IEEE, Jul.-Sep. 2006, pp. 24-29.

\* cited by examiner

*Primary Examiner* — Andrew Sasinowski
(74) *Attorney, Agent, or Firm* — Miles & Stockbridge, P.C.

(57) ABSTRACT

A handheld computer interface includes an enclosure, a mass coupled to the enclosure, and an actuator coupled to the mass to change a position of the mass relative to the enclosure. When the actuator receives a signal indicating a change in the center of mass of the interface, it changes the position of the mass.

22 Claims, 10 Drawing Sheets

HANDHELD COMPUTER INTERFACE WITH HAPTIC FEEDBACK

FIELD OF THE INVENTION

One embodiment is directed generally to a computer interface, and in particular to a handheld computer interface that includes haptic feedback.

BACKGROUND INFORMATION

Haptic feedback can be generated by a device and sensed by kinesthetic receptors to allow a user of the device to perceive forces such as inertia and acceleration. Typically, this kind of haptic feedback is created by applying a force to the body through a physical interface which is grounded to a wall or desk. Also known as "tethered" interfaces, such devices are limited in their range, mobility, and ultimately usability because of their reliance on being coupled to an external structure.

SUMMARY OF THE INVENTION

One embodiment is a handheld computer interface that includes an enclosure, a mass coupled to the enclosure, and an actuator coupled to the mass to change a position of the mass relative to the enclosure. When the actuator receives a signal indicating a change in the center of mass of the interface, it changes the position of the mass.

DETAILED DESCRIPTION

One embodiment is a handheld computer interface that generates a haptic feedback effect by varying a center of mass, thus varying the perceived weight of the computer interface. The computer interface can be used with, for example, computer games and device simulators where the perception of a varying weight is required or enhances the user experience.

Figure 1:
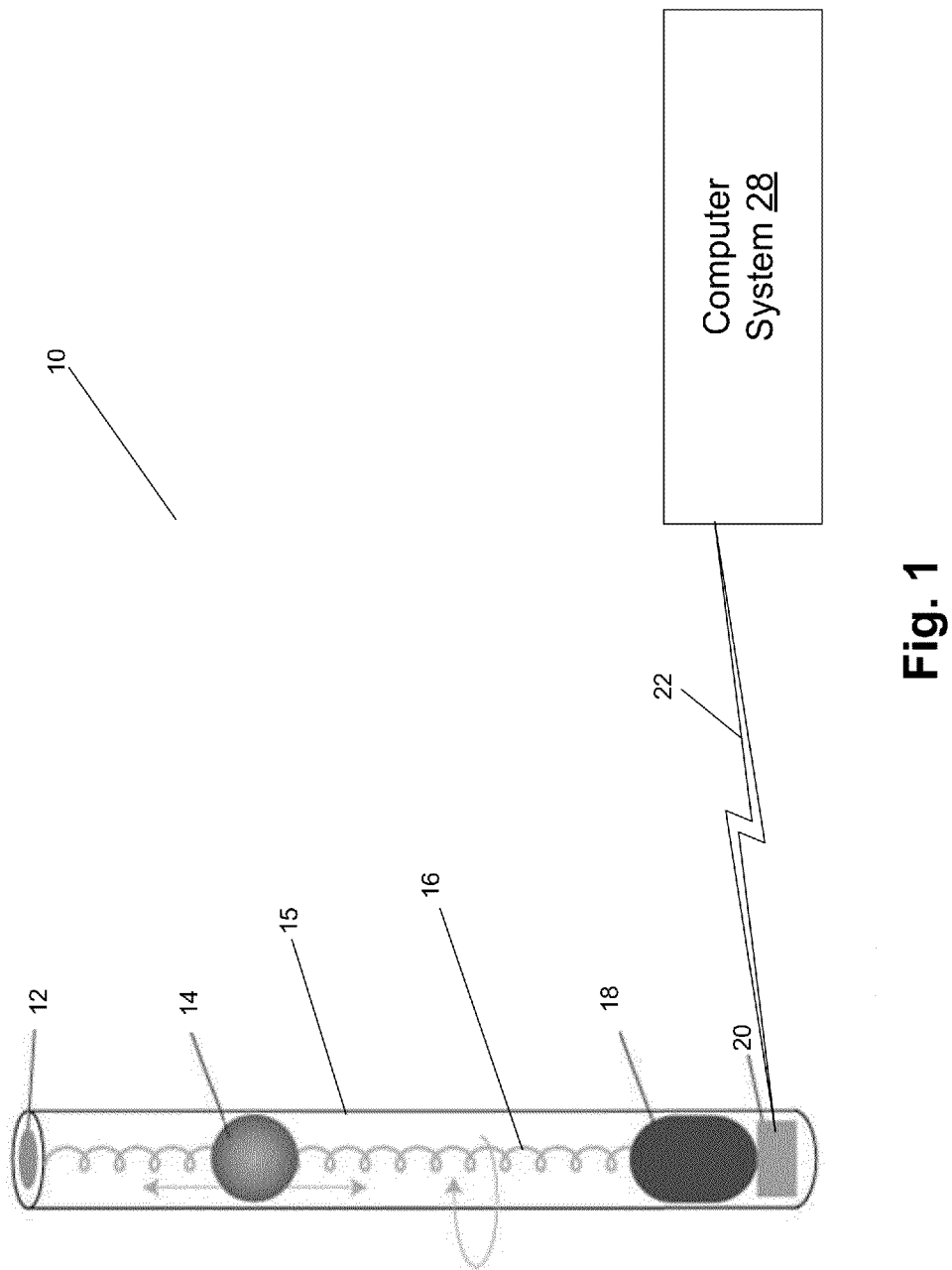
FIG. 1 is a perspective view of a computer interface system in accordance with one embodiment.

FIG. 1 is a perspective view of a computer interface system 10 in accordance with one embodiment. Computer interface system 10 includes a handheld computer interface 15 that is in the form of a rod or tubular enclosure or housing and that houses a motor/actuator 18 coupled to a threaded rod 16. A mass 14 is movably attached to threaded rod 16 so that it moves up and down a long axis of interface 15 when motor 18 rotates rod 16. Interface 15 further houses a wireless transceiver 20 and one or more sensors 12. Wireless transceiver 20 wirelessly couples interface 15 to a computer system 28 via wireless link 22. In other embodiments, interface 15 can be coupled to computer system 28 via any other known methods, including wired methods. In one embodiment, the overall length of handheld computer interface 15 is approximately 61-68 cm and mass 14 has a weight of approximately 160 g.

Sensors 12 include a position sensor that detects the position of mass 14 relative to the long axis of interface 15. Sensors 12 may also include one or more of the following types of sensors:

An accelerometer for sensing acceleration and estimating orientation against gravity;

A gyroscope for sensing swings and rotary velocity to improve gestural capture;

Electric field sensors on the body of interface 15, for multi-touch and/or proximity sensing;

A strain gauge and/or piezo for sensing bend, twist, and/or physical impact;

An infrared reflection sensor for proximity sensing;

A camera for pickup of onscreen cues and/or other visual recognition tasks;

A microphone for ambient sound, voice input, vibration, and/or breath pressure sensing; and Buttons/joysticks/X-pads/triggers for standard gaming operations.

Actuator 18, mass 14 and threaded rod 16 collectively can be referred to as a "center of mass" ("COM") actuator. In other embodiments, handheld interface 15 includes other actuators in addition to the COM actuator. These additional actuators can be used to create other haptic feedback in addition to the haptic feedback that is generated by the COM actuator. The additional actuators may include:

An "impact actuator" that can create a high intensity, high frequency, short duration effect used to simulate collisions with external objects such as baseballs or swords, or recoil from shooting projectiles;

A vibrotactile/vibration actuator, capable of generating a wide variety of vibrotactile effects such as confirmation, envelopes, kinetic-like physics simulations, etc.;

A "flying mass actuator" that is similar to the COM actuator but that it is capable of responding to user input by changing its position in real-time and at high speed.

Figure 2:
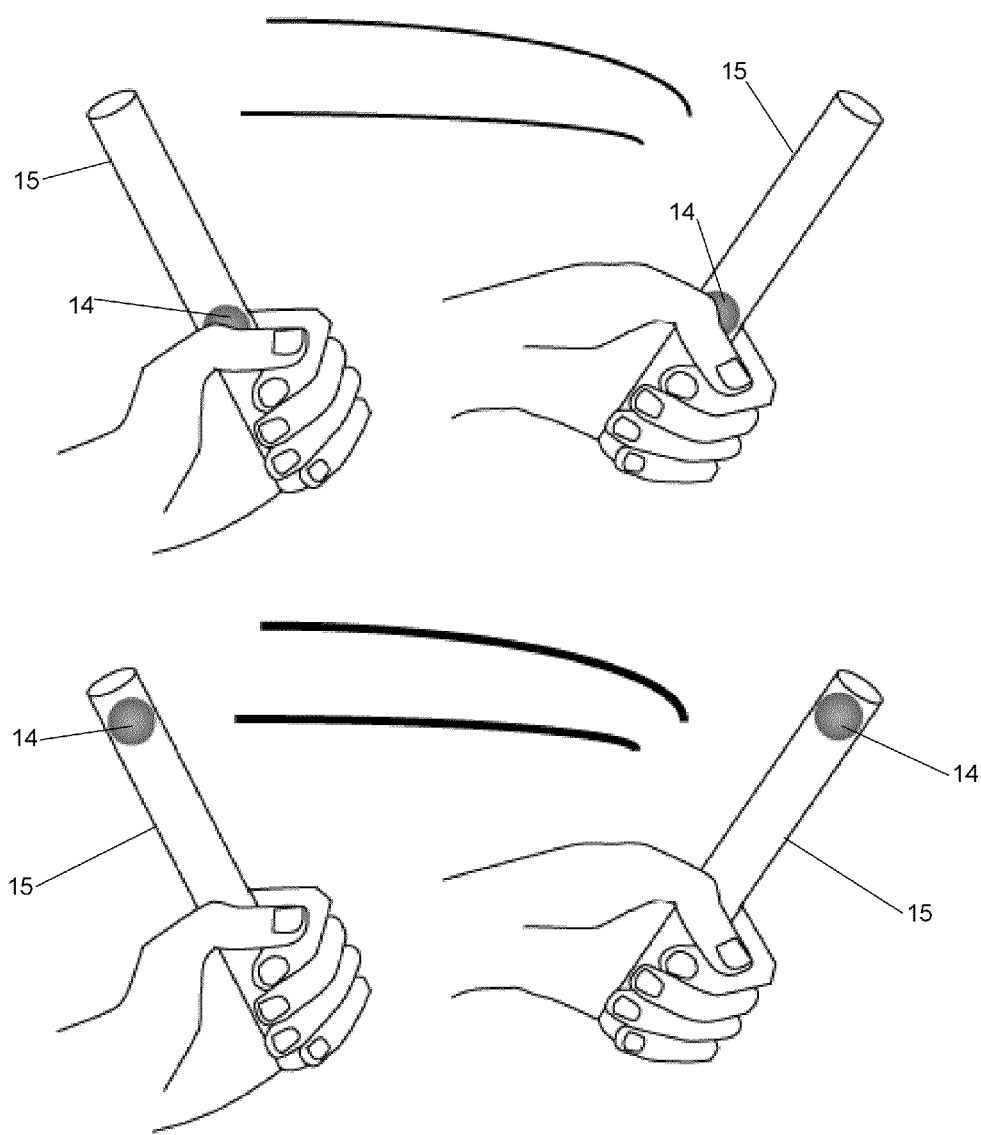
FIG. 2 illustrates two examples of a user swinging the handheld interface in accordance with one embodiment.

In general, computer interface system 10 provides haptic feedback by moving mass 14 to a fixed linear position which provides handheld interface 15 with a controllable center of mass. A user, in one scenario, may use handheld interface 15 as a bat/stick/baton etc. by holding it on one end and swinging. FIG. 2 illustrates two examples of a user swinging interface 15 in accordance with one embodiment. In the upper example of FIG. 2, mass 14 has been moved to a configuration that causes the center of mass to be near the hand. In this configuration, swinging interface 15 causes a relatively low inertial force to be transferred to the hand, giving rise to the perception that the interface has a relatively light weight. In the lower example of FIG. 2, mass 14 has been moved to the end of interface 15 furthest from the hand. In this configuration, swinging interface 15 causes a relatively higher inertial force to be transferred to the hand, making interface 15 feel relatively heavier. The changing center of mass changes the moment of inertia of the overall swinging device.

Figure 3:
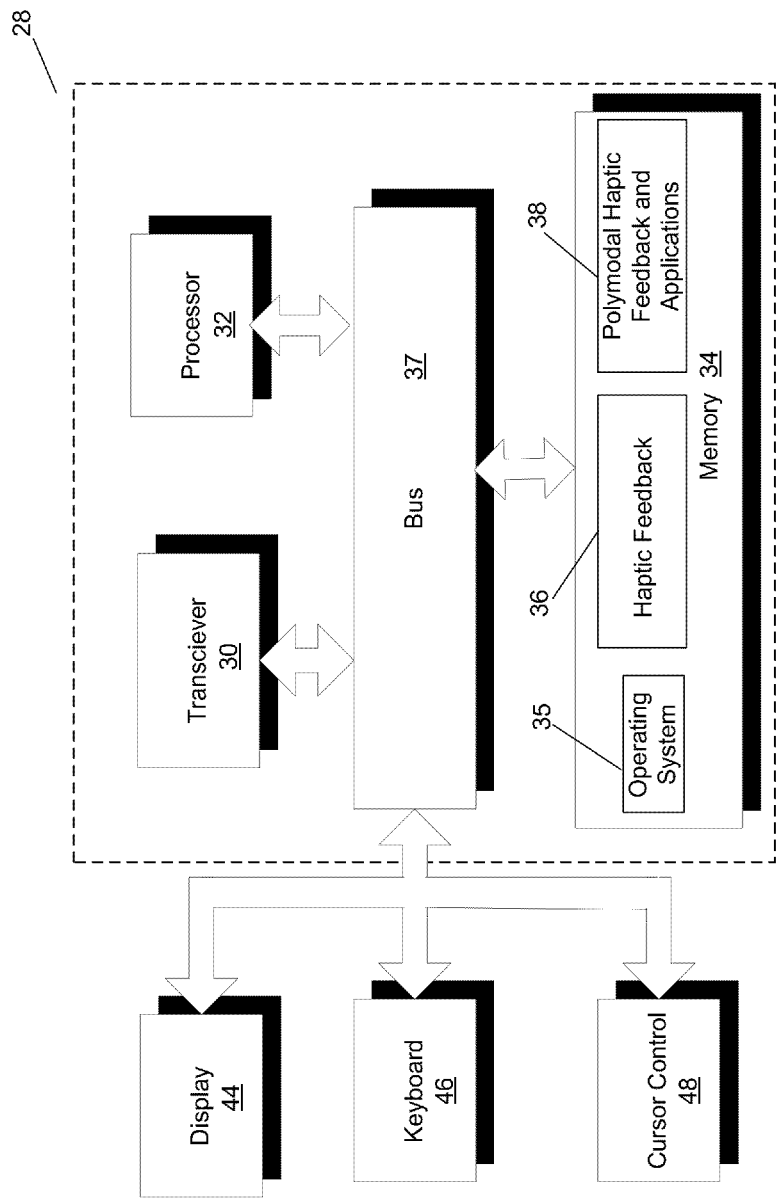
FIG. 3 is a block diagram of a computer system that is wirelessly coupled to the handheld interface.

FIG. 3 is a block diagram of computer system 28 that is wirelessly coupled to handheld interface 15. System 28 includes a bus 37 or other communication mechanism for communicating information, and a processor 32 coupled to bus 37 for processing information. Processor 32 may be any type of general or specific purpose processor. System 28 further includes a memory 34 for storing information and instructions to be executed by processor 32. Memory 34 can be comprised of any combination of random access memory ("RAM"), read only memory ("ROM"), static storage such as a magnetic or optical disk, or any other type of computer readable media. System 28 further includes a transceiver 30 that provides communication with transceiver 20 of handheld interface 15. Computer system 28 may be a general purpose computer, or it may be a specialty computer system such as a video game console.

Computer readable media may be any available media that can be accessed by processor 32 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 32 is further coupled via bus 37 to a display 44, such as a Liquid Crystal Display ("LCD"), for displaying information to a user. A keyboard 46 and a cursor control device 48, such as a computer mouse, is further coupled to bus 37 to enable a user to interface with system 28 as an alternative or in addition to using handheld interface 15.

In one embodiment, memory 34 stores software modules that provide functionality when executed by processor 32. The modules include an operating system 35 that provides operating system functionality for system 28. The modules further include a haptic feedback module 36 that generates haptic feedback on handheld interface 15 by changing the position of mass 14. System 28 further includes a polymodal haptic feedback and applications module 38 that generates additional haptic feedback on handheld interface 15, and includes an application such as a game that requires haptic feedback to be generated on handheld interface 15 in conjunction with the application. In another embodiment, the functionality of modules 36 and 38 is subsumed in a single haptic feedback management module that is responsible for synthesizing and displaying polymodal haptic effects, including mass bias (kinesthesia), mass motion (kinesthesia), vibration (vibrotaction), impact (vibrotaction), etc. The haptic feedback management module takes a generalized, physics-based feedback profile (e.g., size of stick, position of stick, position of ball impact, and other contextual factors within the virtual environment) and dispatches haptic feedback signals to individual actuators as appropriate (e.g., COM, vibration, impact, etc.).

Figure 4:
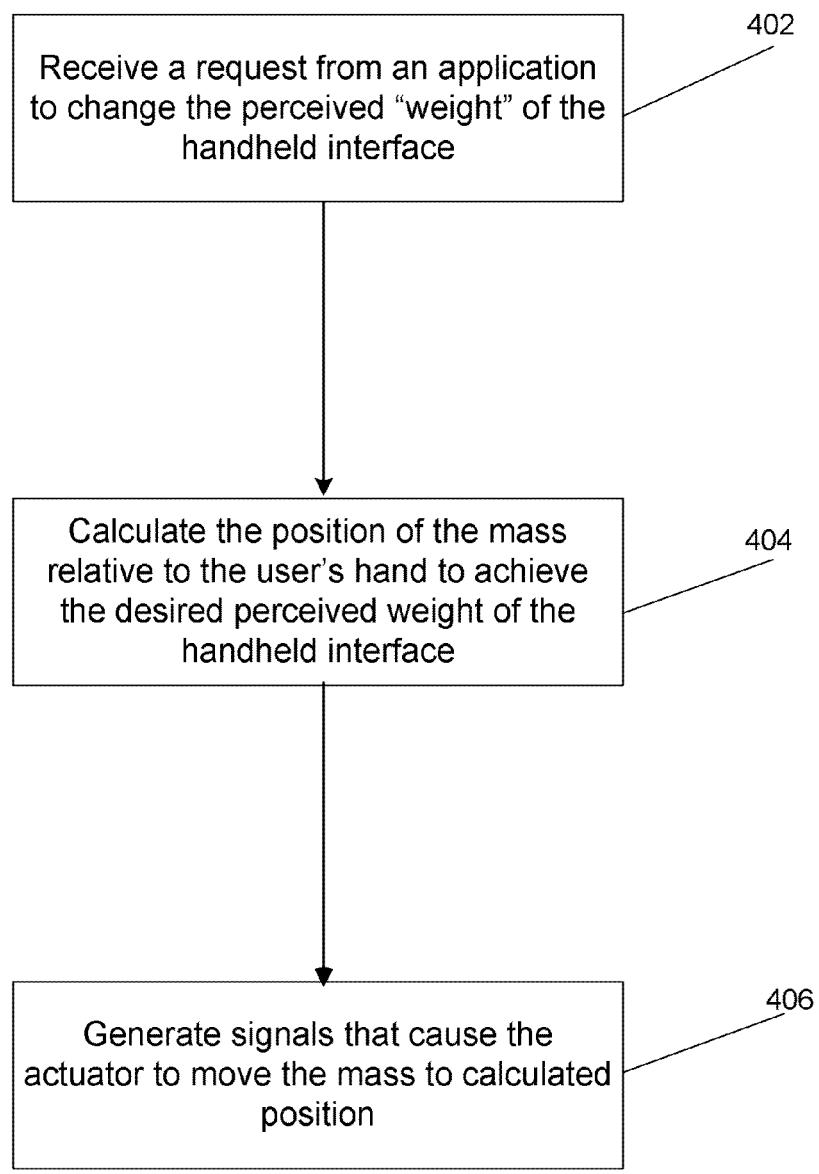
FIG. 4 is a flow diagram of the functionality of a haptic feedback module when initiating haptic feedback changes on the handheld interface in accordance with one embodiment.

In one embodiment, haptic feedback module 36 initiates haptic feedback changes on handheld interface 15. FIG. 4 is a flow diagram of the functionality of haptic feedback module 36 when initiating haptic feedback changes on handheld interface 15 in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, haptic feedback module 36 receives a request from application 38 to change the perceived "weight" of handheld interface 15. The request can be to increase or decrease the perceived weight from its current position. Application 38 may be an interactive video game such as a golf or baseball game, or any type of application that requires the user to swing or otherwise interact with handheld interface 15.

At 404, haptic feedback module 36 calculates the position of mass 14 relative to the user's hand to achieve the desired perceived weight of interface 15.

At 406, haptic feedback module 36 generates signals that causes actuator 18 to move mass 14 to the calculated position. Sensor 12 can provide feedback of the position of mass 14 so that it can be properly positioned.

Concurrently with the haptic feedback requests at 402, polymodal haptic feedback and application module 38 also generates other haptic feedback requests that are sent to other sensors of handheld interface 15 to generate other haptic feedback such as vibrations, high intensity impacts, etc.

Figure 5:
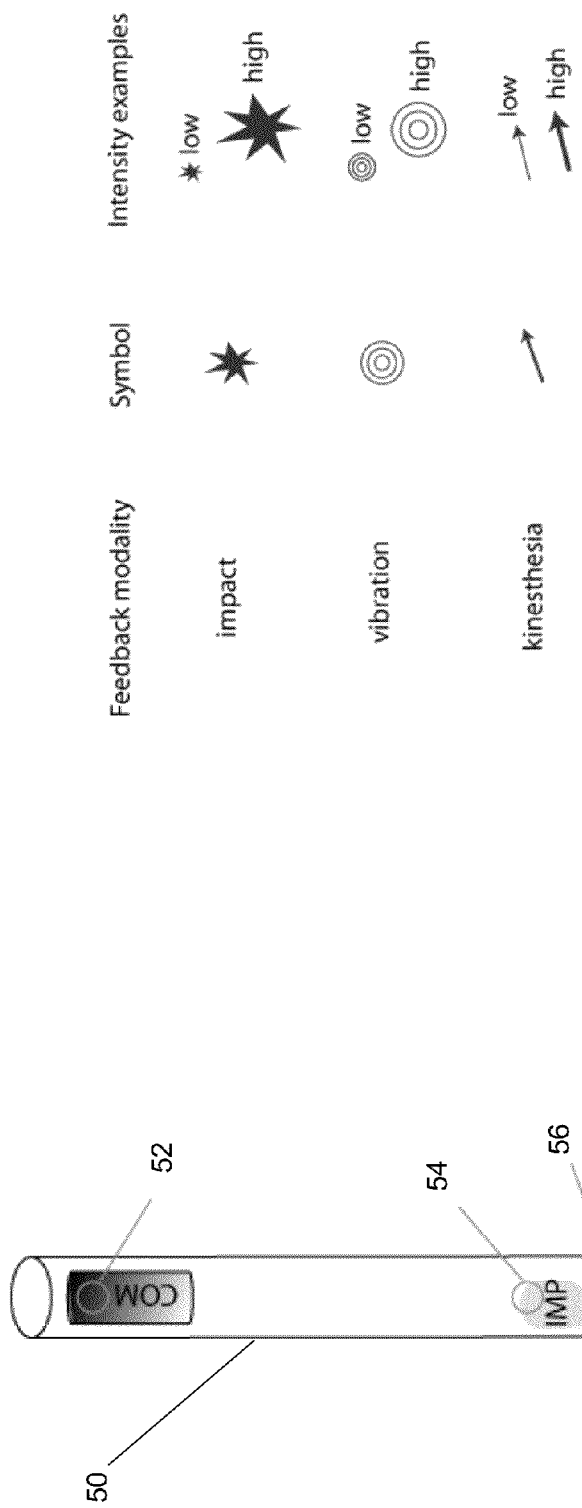
FIG. 5 is a perspective view of the handheld computer interface in accordance with one embodiment.

FIG. 5 is a perspective view of a handheld computer interface 50 in accordance with one embodiment. Handheld interface 50 is similar to handheld interface 15 of FIG. 1 except, in addition to COM actuator 52, it includes an impulse actuator 54 and a vibration actuator 56. Handheld interface 50 includes the other components of handheld interface 15 of FIG. 1 (e.g., transceiver, sensors, etc.) and is wirelessly coupled to computer system 28 of FIG. 2. Handheld interface 50 can generate three different types of haptic feedback modalities as illustrated on FIG. 5: impact, vibration and kinesthesia. FIG. 5 further illustrates symbols for each of these modalities, with the size of the symbols reflective of the relative intensity of the feedback. These symbols are used to illustrate the following example uses of handheld interface 50.

Figure 6A:
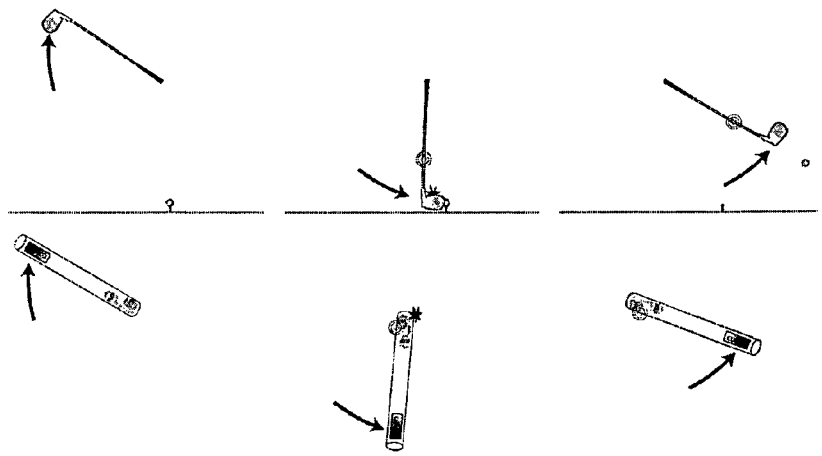
FIG. 6a illustrates a configuration where a center of mass actuator is at its furthest point from the hand.
Figure 6B:
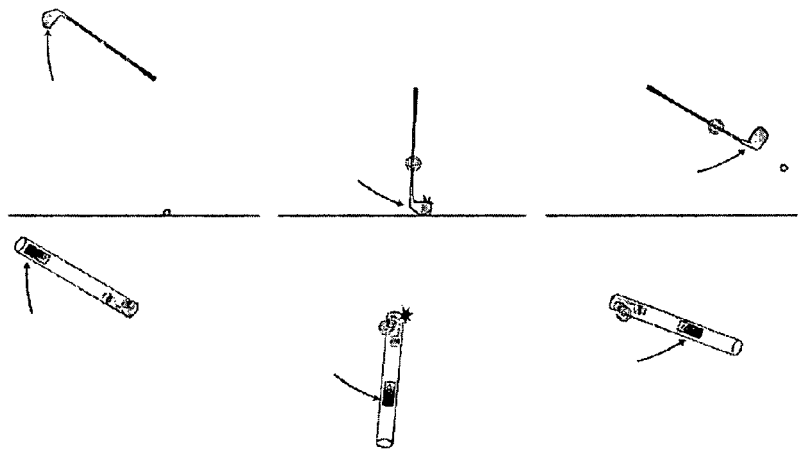
FIG. 6b illustrates a configuration where the center of mass actuator is at a mid-point relative to the hand.
Figure 6C:
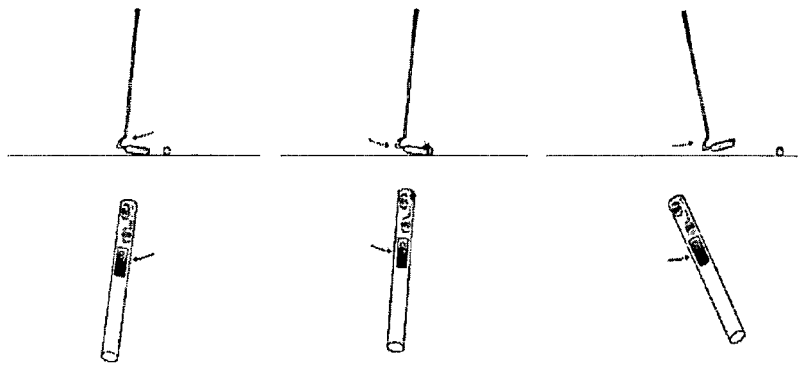
FIG. 6c illustrates a configuration where the center of mass actuator is closest to the hand.

In one example use of handheld interface 50, in a golf game application, a user selects a wood for a long drive to the putting green. When the club is selected, COM actuator 52 moves to its furthest point from the hand, so that the interface has high inertia when swung. FIG. 6a illustrates a configuration where COM actuator 52 is at its furthest point from the hand. The user makes a few practice swings to get used to the inertia, steps up to the virtual tee, and makes a play. The impact of the club with the ball is felt: it is weak, and the shaft resonates with a low frequency vibration using vibration actuator 56. It is clear from the touch feedback that the user has not hit the sweet spot, and indeed, the ball has sliced right. For the next play, the user selects an iron. This club is considerably lighter, so COM actuator 52 moves up the shaft to reduce inertia. FIG. 6b illustrates a configuration where COM actuator 52 is at a mid-point relative to the hand. The user takes a practice swing and then makes a play. This time the ball is hit right in the sweet spot: a sharp, crisp impact is felt from impact actuator 54, with very little trailing vibration. The user knows before seeing the ball land on the green that it was a good play. For the next play, the user selects a putter. Because this club is very light, COM actuator 52 moves almost inside the user's grip. FIG. 6c illustrates a configuration where COM actuator 52 is closest to the hand. Now swinging the club takes very little effort. The user practices, and putts. The impact is felt as a light, crisp pop and the ball falls into the hole for par.

In this example, the typical golfing experience of beginning a hole using a heavy club (in order to drive the ball a longer distance) and progressing to lighter clubs (that drive shorter distances but are easier to control) is re-created by interface 50 by positioning COM actuator 52. The combination of impact actuator 54 and vibration actuator 56 is not only used for confirmation, but also for immediate feedback about how the ball was hit. Hitting the sweet spot feels different than not hitting it, and the user knows whether the swing was good even before seeing where the ball lands.

Figure 7:
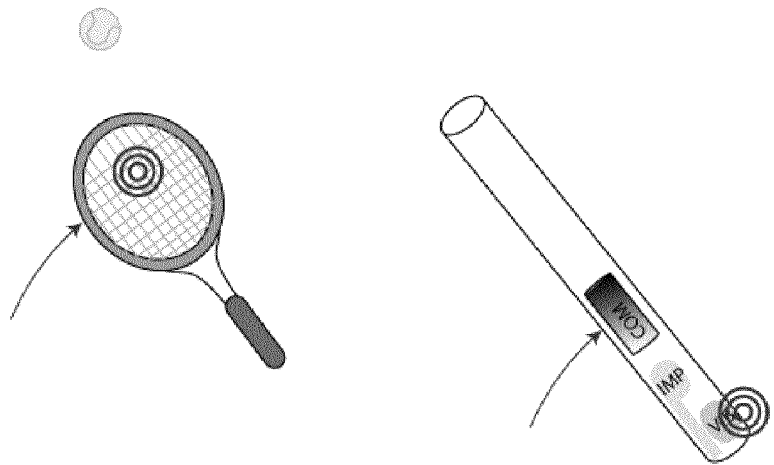
FIG. 7 illustrates three different configurations of the handheld interface for the tennis game.
Figure 7:
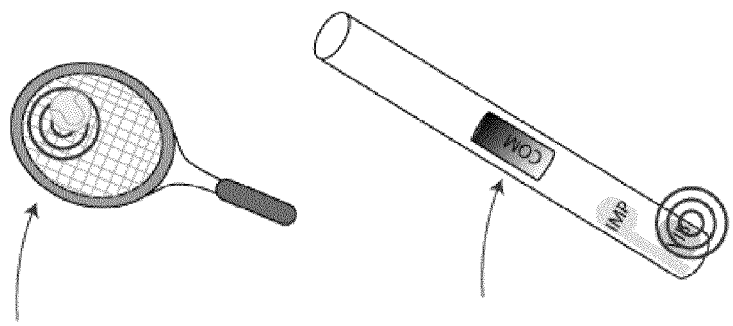
Figure 7:
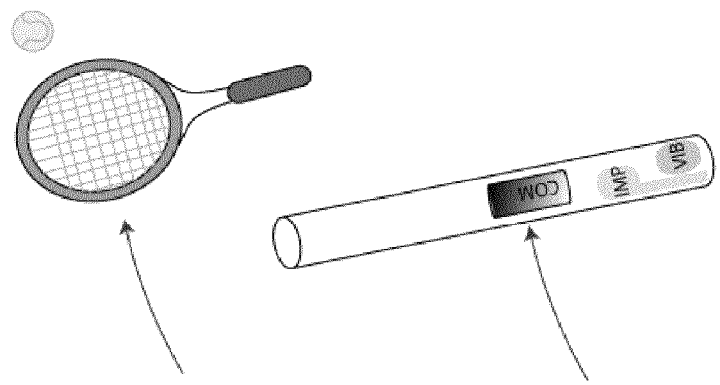

In another example use of handheld interface 50, in a tennis game a user is receiving a serve. FIG. 7 illustrates the three different configurations of handheld interface 50 for the tennis game. The user returns the ball with a slicing motion, putting spin on the ball. The non-perpendicular impact is provided by a light vibration from vibration actuator 56 with a long duration as the virtual ball rolls on the strings for a moment. The user then rushes the net to volley. Here the user begins to return balls hit toward him at high velocity; vibration actuator 56 simulates this with high intensity pulses. Finally, the user misjudges the ball's position and it hits the rim of the racket rather than the strings. The racket resonates with an unpleasant, long duration, low frequency, high intensity vibration, and the ball falls into the net. In this example, vibration actuator 56 alone can be used to simulate the sensations that accompany the different moves in tennis. Although in this tennis example COM actuator 32 does not change configuration during active usage, its position is set at the beginning of the match to reflect the center of mass of the racket selected for play.

In another example use of handheld interface 50, in a baseball game, the user is batting in the bottom of the 9th inning with a runner on 3rd base and only needs 1 run to tie the game. The user selects a bat, and COM actuator 52 moves to simulate the weight of the bat chosen. After taking some practice swings, the user steps up to the plate. On the first pitch, the user swings hard and tips the ball, simulated by a light pop from impact actuator 54 and a light residual vibration from vibration actuator 56. The fielders in the game (other players on the network) see how hard the user is swinging and adjust their strategy, by moving their infielders to keep ground balls from going into the outfield. On the second pitch, however, the batter goes into bunt position. At the moment the ball hits the bat (displayed by impact actuator 54), the user gestures with the bat to "catch" it and direct it in the hole between the catcher and the first baseman. The runner on 3rd base scores and extra innings are needed. In this example, when the user swings the bat hard, the weight of the bat and strength of the swing can be felt as a result of COM actuator 52. Typical vibrations and impacts associated with baseball batting can be felt with impact actuator 54 and vibration actuator 56 working in concert.

Figure 8:
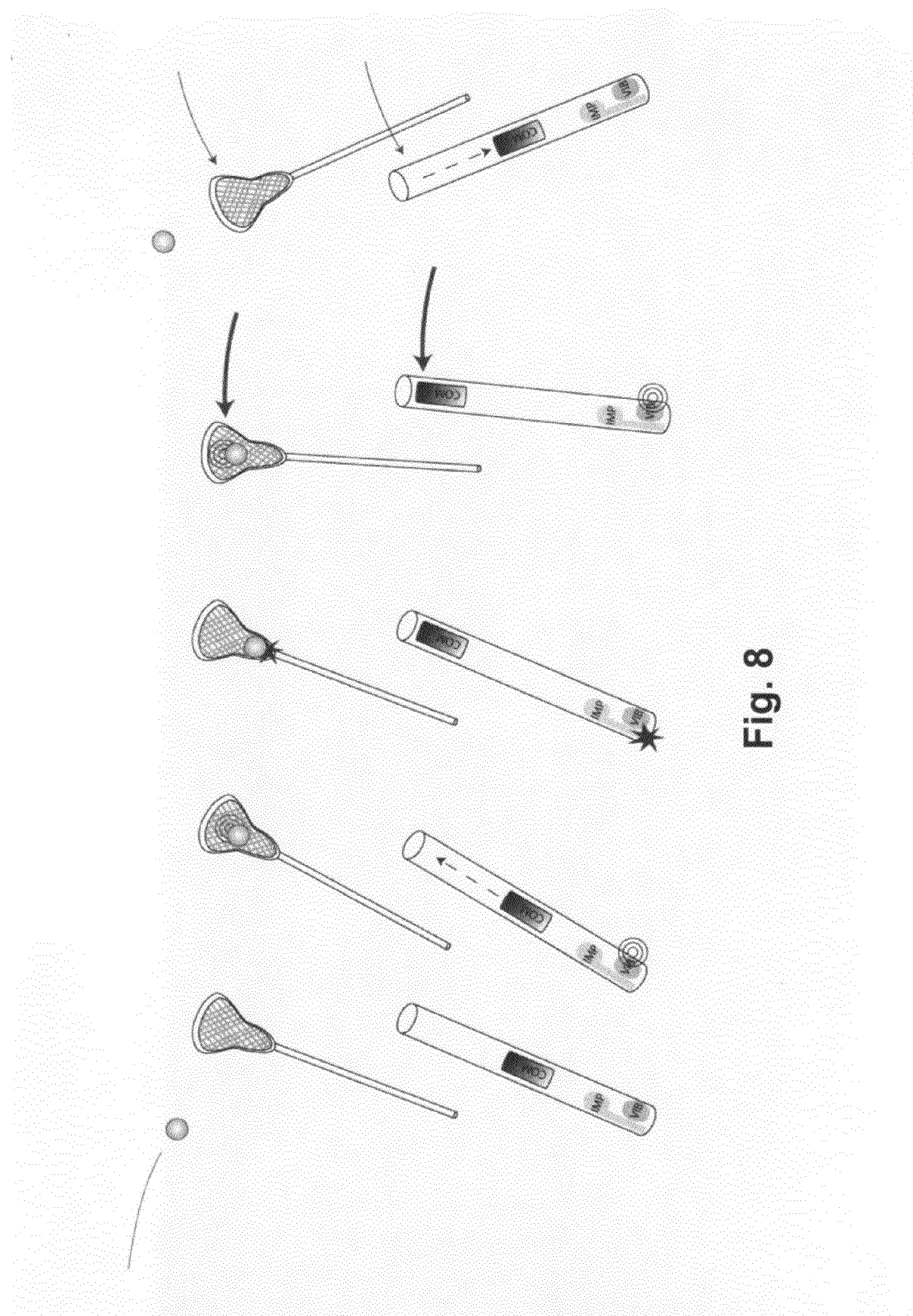
FIG. 8 illustrates different configurations of the handheld interface for the lacrosse game.

In another example use of handheld interface 50, in a lacrosse game a user is playing in an attack position, waiting for a pass as the point player (another player on the network) brings the ball up the field. FIG. 8 illustrates the different configurations of handheld interface 50 for the lacrosse game. When the user is spotted as being open, the point passes the ball to the user. Without the "cushioning gesture" needed to catch a lacrosse ball, the ball would simply bounce out of the net. However, this user is experienced and knows how to cushion the ball. When the ball approaches the user's stick, the user catches it, activating vibration actuator's 56 simulation of a ball rolling partway down the tube (as the ball rolls down the tip of the head of the stick into the pocket). When the ball reaches the pocket, impact actuator 54 provides a soft impulse. COM actuator 52 moves up to the tip of the stick, simulating the weight of the ball in the stick. As the user stick handles, the slight movement and bouncing of the ball can be felt. When the user reaches the goal, the user fires an overhand shot. Vibration actuator 56 simulates the ball moving at high velocity out the top of the stick, and COM actuator 52 drops to a lower position to indicate the ball is no longer present at the end of the stick.

In order to create a rolling ball simulation for the lacrosse game, inclination sensing and vibrotactile feedback can be used to provide a convincing simulation of a ball rolling back and forth inside a tube. This illusion can be used for modeling the feeling of catching and throwing a ball with a lacrosse stick. COM actuator 52 is used to convey whether there is a ball present in the stick, which tends to make the stick feel "top heavy."

Figure 9:
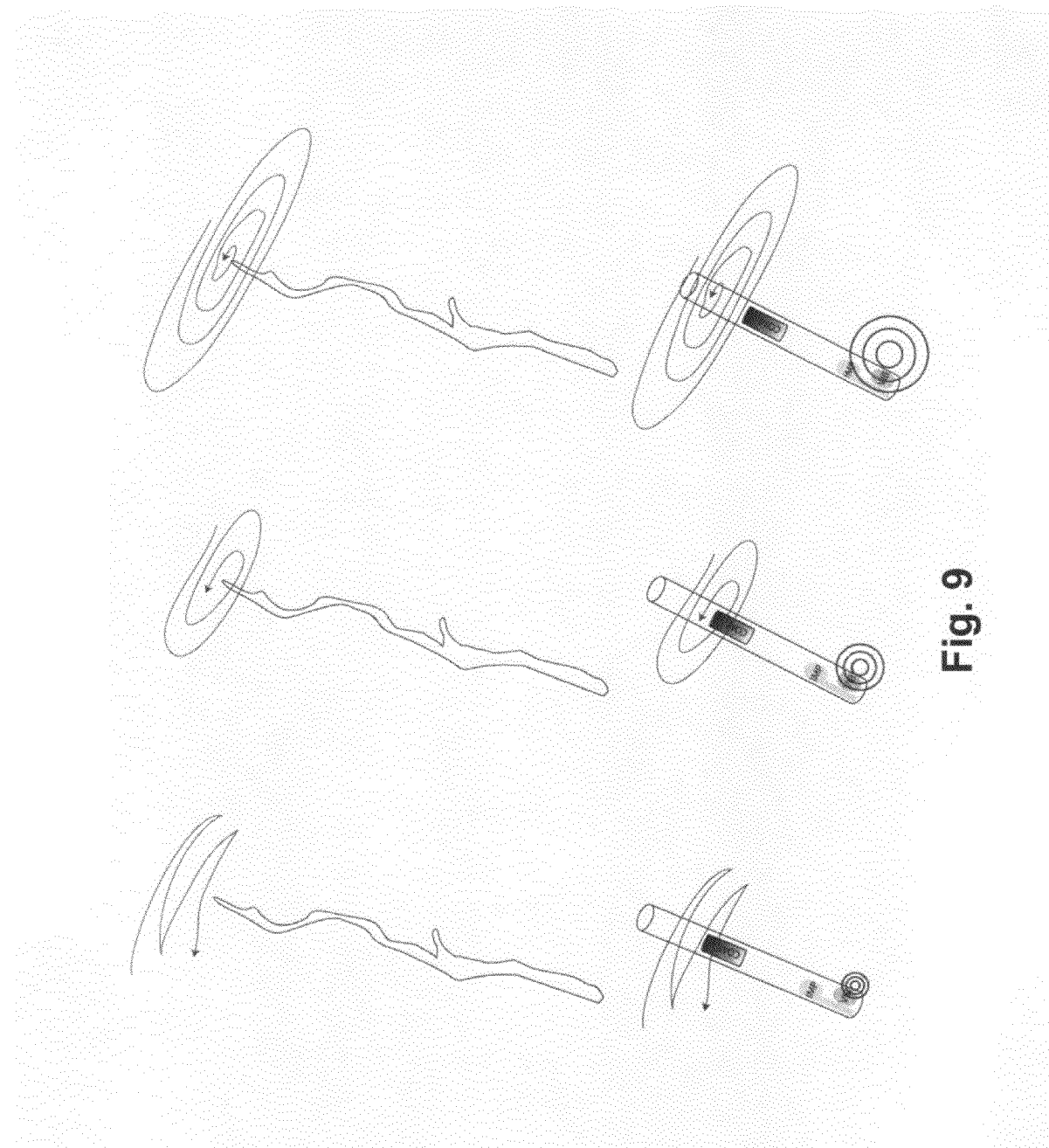
FIG. 9 illustrates different configurations of the handheld interface for the role playing game.

In another example use of handheld interface 50, a medieval role playing game, a user is carrying user interface 50 that simulates a battle axe or staff. FIG. 9 illustrates the different configurations of handheld interface 50 for the role playing game. COM actuator 52 is configured to the very furthest point from the hand, simulating a very cumbersome weapon. When challenged by another player to a fight, the user changes the weapon to a wooden staff, causing COM actuator 52 to move down to a more balanced position. Instead of using fighting gestures to fend off his enemy, the user performs a sequence of open-air moves with the staff to cast a magical spell. As the user gesticulates, vibration actuator 56 responds with increasing intensity, providing feedback that the spell is being cast correctly. At the same time, a visual display at the end of the staff begins to glow a deep indigo. However, even though the user has seen other players cast this spell by making a final move of waving the staff near the ground, the user did not realize that the staff must actually be rubbed against the ground at a particular pressure, registering a vibration signal in the accelerometer of a particular intensity. Because the spell fails, the vibration actuator's response sputters and then falls off abruptly, and the visual display on the staff fades away. The user's opponent can see that the user has failed, and chops off the user's head.

In the role playing game example, interface 50 can function as tools that are useful in different ways. A battle axe is tiresome to swing in real life, and thus to swing one around inside the game requires strength and stamina. COM actuator 52 reflects the weight distribution of the current tool or weapon. When the staff tool is used, vibration feedback indicates whether a spell cast is being executed properly, as well as provides a sensorial reward for the user. The glowing visual display functions the same way. In this example, impact actuator 54 is not used, but it would likely be used in a clash of medieval weapons.

Figure 10:
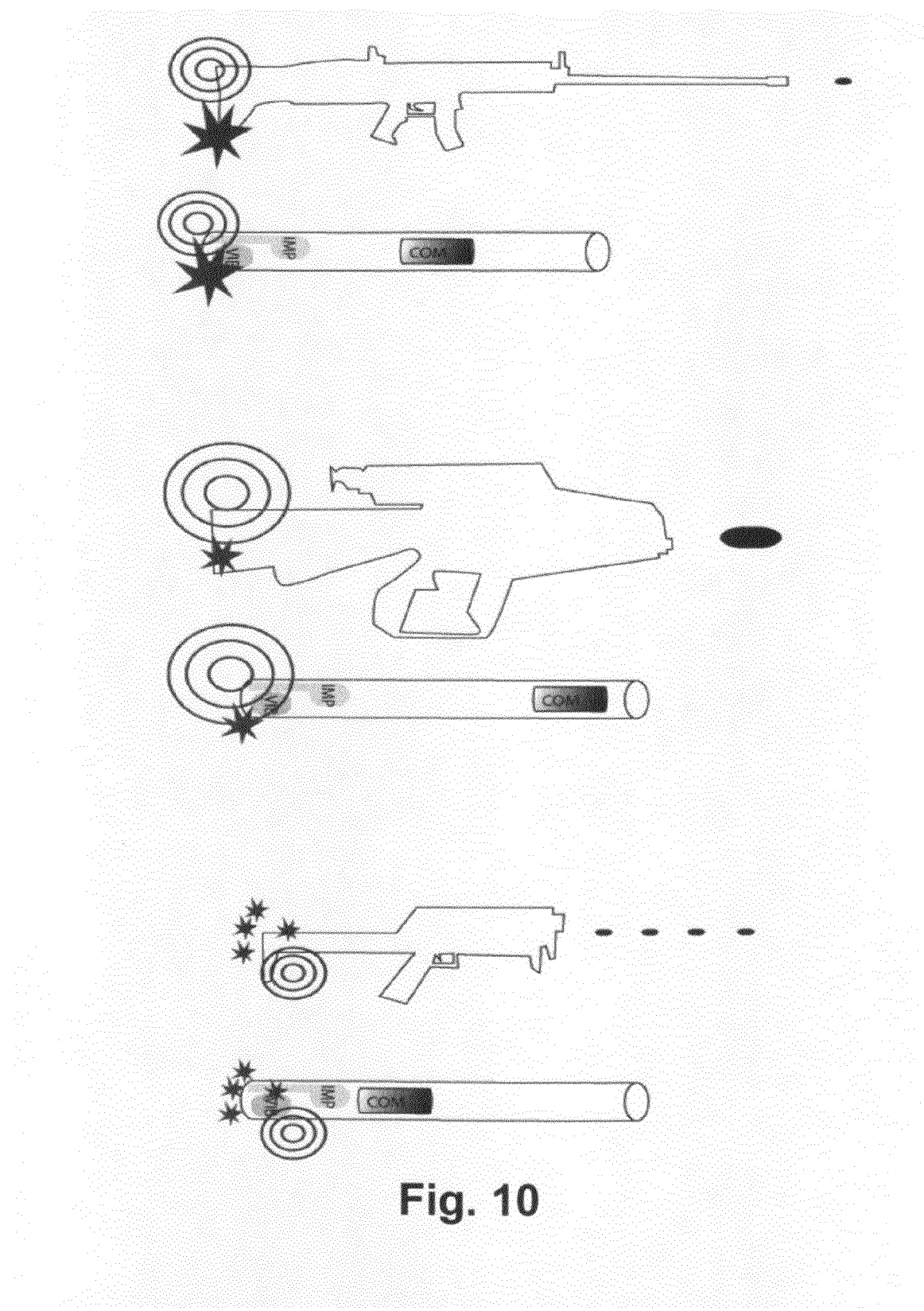
FIG. 10 illustrates different configurations of the handheld interface for a shooting game.

In another example use of handheld interface 50, in a futuristic military game, the standard-issue firearm is a rifle with under-barrel grenade launcher. FIG. 10 illustrates the different configurations of handheld interface 50 for a shooting game. When this well-balanced weapon is selected, COM actuator 52 is moved to the middle of interface 50. The user starts out in a sniper position on the top of a building, firing at personnel with the rifle. When the rifle trigger is squeezed, impact actuator 54 produces a stinging high-frequency, high-amplitude vibration directly on the palm and the shoulder stock. At the same moment, vibration actuator 56 is used to create the residual vibrations in the gun after it is fired. When the user finally sees the vehicle that is to be destroyed, the user takes aim and fires a grenade, resulting in an intense, long-duration vibration. The user was right on target; the vehicle is neutralized. To exit the building, the user must descend a long stairwell. Because the user may encounter close-range combat, the weapon is switched to a light subcompact machine gun. When the new gun is selected, COM actuator 52 moves toward the hand to simulate the lighter weapon. Now when the user holds down the trigger, impact actuator 54 fires repeatedly, simulating multiple rounds. Vibration actuator 56 activates at the same time, with a vibration profile that reflects the feel of that particular weapon.

For games involving kinetic weapons, the combination of impact and vibration actuators is used to simulate the firing of different-sized rounds from different guns. The weight distribution of the particular weapon is simulated as well by the COM actuator.

In another example use of handheld interface 50 a suite of musical instruments is made available through the use of interface 50. When the "rain stick" is selected, tilting interface 50 to a vertical position causes tiny virtual beads to fall through a perforated space, creating a soothing sound as well as light, ongoing vibrations from the vibration actuator. When a bore flute is selected, COM actuator 52 moves close to the end to simulate a lighter object. Now blowing into the microphone at one end of interface 50 and touching the outside of the multi-touch surface in various places creates different notes, as well as accompanying vibrotactile feedback. Interface 50 can also simulate non-conventional instruments. In one example, the user brushes the outside of interface 50. Ridges in the surface are simulated with short, clicking audio feedback, as well as repeated light impacts from impact actuator 54. In another example, rubbing interface 50 against external surfaces creates a vibration signal in the microphone and/or accelerometer that is used to excite and modulate a synthesizer.

As disclosed, the handheld computer interface includes a COM actuator that allows the perceived weight of the interface to change. Alone or combined with other haptic feedback, the computer interface can be used in many different game applications or other applications.

In embodiments disclosed above, the handheld computer interface is in the shape of a rod or tube. However, in other embodiments, the handheld interface can be any other shape that can be held by a user, such as a disk, sphere, torus, gamepad, gun-shape, flexible tube, etc. Further, components of the interface that are internal in above embodiments can be placed externally in other embodiments Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A handheld computer interface comprising:
an enclosure;
a mass coupled to the enclosure, wherein the enclosure comprises a first end adapted to be grasped by a user when the user is interacting with an application, and a second end; and
an actuator coupled to the mass to change a position of the mass relative to the enclosure;
wherein the actuator is adapted to receive a signal from the application indicating a change to a weight of the interface as perceived by the user to a desired perceived weight and changes the position of the mass in response to the signal;
wherein the handheld computer interface forms an axis between the first end and the second end, and the actuator changes the position by moving the mass along the axis from a fixed first position relative to the first end to a fixed second position relative to the first end, wherein the fixed second position is a distance from the fixed first position;
wherein the fixed first position is an initial position of the mass when the signal is received and the fixed second position is a final resting position of the mass in response to the signal, and the distance is determined based on the desired perceived weight and the distance is based on a determined change of a center of mass of the interface to achieve the desired perceived weight.

2. The handheld computer interface of claim 1, further comprising:
a wireless transceiver coupled to the actuator for receiving the signal.

3. The handheld computer interface of claim 1, further comprising a first sensor that detects the position of the mass.

4. The handheld computer interface of claim 1, wherein the signal is generated by an application executed on a computer system.

5. The handheld computer interface of claim 1, wherein the application is a video game.

6. The handheld computer interface of claim 1, wherein the enclosure has a tubular shape and has a long axis, and the position of the mass varies along the long axis.

7. The handheld computer interface of claim 1, wherein the change of position of the mass causes the interface to change an inertial property of the interface to the user.

8. The handheld computer interface of claim 1, further comprising at least one sensor from a group of sensors comprising: an accelerometer, a gyroscope, an electric field sensor, a strain gauge, an infrared reflection sensor, a camera, and a microphone;
wherein the sensor generates sensor signals transmitted from the handheld computer interface.

9. The handheld computer interface of claim 1, further comprising an impact actuator.

10. The handheld computer interface of claim 1, further comprising a vibrotactile actuator.

11. A method of operating a handheld computer interface that is grasped by a user at a first point and comprises a second point, wherein the interface is adapted to be grasped when the user is interacting with an application, the method comprising:
receiving a signal from the application that a weight of the interface as perceived by the user should be changed to a desired perceived weight; and
in response to the signal, moving a mass relative to the first point, wherein the mass is coupled to the computer interface;
wherein the handheld computer interface comprises an axis between the first point and the second point, and the mass is moved along the axis from a fixed first position relative to the first point to a fixed second position relative to the first point, wherein the fixed second position is a distance from the fixed first position;
wherein the fixed first position is an initial position of the mass when the signal is received and the fixed second position is a final resting position of the mass in response to the signal, and the distance is determined based on the desired perceived weight and the distance is based on a determined change of a center of mass of the interface to achieve the desired perceived weight.

12. The method of claim 11, wherein the handheld computer interface is a cylinder having a long axis, and the mass is moved along the long axis.

13. The method of claim 12, wherein the mass is internal to the rod.

14. The method of claim 12, further comprising sensing a position of the mass relative to the first point.

15. The method of claim 12, wherein the application comprises a video game, and the signal is generated based on an activity on the video game.

16. The method of claim 15, wherein the video game is a golf game, and the handheld computer interface simulates a golf club.

17. The method of claim 15, wherein the video game is a baseball game, and the handheld computer interface simulates a baseball bat.

18. The method of claim 15, wherein the video game is a lacrosse game, and the handheld computer interface simulates a lacrosse stick club.

19. A non-transitory computer readable medium having instructions stored thereon that, when executed by a processor, causes the processor to operate a handheld computer interface that comprises an enclosure, an actuator and a mass coupled to the actuator, the operating comprising:
   receiving a request from an application to change a perceived weight of the handheld computer interface, wherein the interface comprises a first end adapted to be grasped by a user when the user is interacting with the application, and a second end;
   calculating a position of the mass relative to the hand to achieve the perceived weight; and
   generating signals to cause the actuator to move the mass to the calculated position;
   wherein the handheld computer interface forms an axis between the first end and the second end, and the mass moves along the axis from a fixed first position relative to the first end to a fixed second position relative to the first end, wherein the fixed second position is a distance from the fixed first position;
   wherein the fixed first position is an initial position of the mass when the signal is received and the fixed second position is a final resting position of the mass in response to the signal, and the distance is determined based on the changed perceived weight and the distance is based on a determined change of a center of mass of the interface to achieve the desired perceived weight.

20. The computer readable medium of claim 19, wherein the application is a video game.

21. The computer readable medium of claim 20, wherein the video game is a golf game and the handheld computer interface functions as a golf club.

22. The computer readable medium of claim 19, wherein the enclosure is a rod that comprises a long axis, and the mass moves along the long axis.

* * * * *